United States Patent
Yasuhara

(10) Patent No.: US 8,985,663 B2
(45) Date of Patent: Mar. 24, 2015

(54) MOUNTING STRUCTURE FOR VEHICULAR INTERIOR MEMBER

(71) Applicant: Suzuki Motor Corporation, Shizuoka-ken (JP)

(72) Inventor: Ryotaro Yasuhara, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/974,153

(22) Filed: Aug. 23, 2013

(65) Prior Publication Data

US 2014/0191534 A1 Jul. 10, 2014

(30) Foreign Application Priority Data

Jan. 10, 2013 (JP) ................................. 2013-002542

(51) Int. Cl.
- *B62D 33/00* (2006.01)
- *B60R 13/02* (2006.01)
- *B60J 10/08* (2006.01)
- *B60J 10/00* (2006.01)

(52) U.S. Cl.
CPC ......... *B60R 13/0237* (2013.01); *B60R 13/0206* (2013.01); *B60J 10/0031* (2013.01); *B60J 10/081* (2013.01)
USPC ...................................... 296/39.1

(58) Field of Classification Search
CPC ........... B60J 7/022; B62D 25/06; B64C 1/12; B64C 2001/0072; B64C 3/182; B01D 29/33; B01D 29/52; C04B 41/009; C04B 41/4505; C04B 41/4582
USPC ............................ 296/39.1, 216.07; 52/716.5
See application file for complete search history.

(56) References Cited

U.S. PATENT DOCUMENTS

| | | | | |
|---|---|---|---|---|
| 4,587,762 A | * | 5/1986 | Adell | 49/462 |
| 4,614,347 A | * | 9/1986 | Kruschwitz | 277/641 |
| 5,288,121 A | * | 2/1994 | Graves | 296/146.9 |
| 5,613,327 A | * | 3/1997 | Sauve | 49/490.1 |
| 6,082,048 A | * | 7/2000 | Backes et al. | 49/377 |
| 7,055,285 B2 | * | 6/2006 | Nozaki | 49/479.1 |
| 8,051,607 B2 | * | 11/2011 | Okajima et al. | 49/490.1 |
| 8,225,554 B2 | * | 7/2012 | Nozaki | 49/498.1 |
| 2004/0137197 A1 | * | 7/2004 | Watanabe | 428/122 |
| 2008/0030042 A1 | * | 2/2008 | Slobodecki et al. | 296/97.9 |
| 2011/0078959 A1 | * | 4/2011 | Nozaki | 49/489.1 |
| 2014/0138988 A1 | * | 5/2014 | Kisaku et al. | 296/210 |

FOREIGN PATENT DOCUMENTS

JP 2004-306685 11/2004

* cited by examiner

*Primary Examiner* — Kiran B Patel
(74) *Attorney, Agent, or Firm* — Myers Bigel Sibley & Sajovec, P.A.

(57) ABSTRACT

A mounting structure for a vehicular interior member is provide and includes an opening flange formed by joining an outer flange of an outdoor-side panel and an inner flange of an indoor-side panel to each other at the peripheral edge of a door opening, an opening trim fitted to the opening flange, and an interior member that covers the vehicle indoor side of the indoor-side panel. An insertion piece extending from the edge part back surface of the interior member, together with the opening flange, is pinched by the opening trim. At the tip end of the insertion piece, a protrusion capable of being locked to the edge end of the opening flange is formed, and by fitting the opening trim to the opening flange in the state in which the protrusion is locked, the edge part of the interior member is fixed to the opening flange.

5 Claims, 5 Drawing Sheets

MOUNTING STRUCTURE FOR VEHICULAR INTERIOR MEMBER

RELATED APPLICATION

This application claims priority from Japanese Patent Application No. 2013-002542, filed Jan. 10, 2013, the disclosure of which is incorporated by reference herein in its entirety.

FIELD AND BACKGROUND OF THE INVENTION

The present invention relates to a mounting structure for a vehicular interior member. More particularly, it relates to a structure of a joining portion between an opening trim, which is fitted to an opening flange formed on a vehicle body panel of a vehicular door opening portion, and an interior member.

As a structure of a joining portion between an opening trim in a vehicular door opening portion and an interior member, there has been publicly known a structure in which the edge portion of an interior member is fixed by pinching a terminal portion (insertion piece) extending from the back surface side of an edge portion of an interior member, together with an opening flange, by the opening trim (for example, see Japanese Unexamined Patent Application Publication No. 2004-306685).

FIGS. 1 and 2 show a state in which a quarter lower trim 2, which is an interior member that covers the surface on the indoor side of a vehicle body panel 1 in a quarter portion of a four-door vehicle, is mounted. The vehicle body panel 1 is formed by weldedly joining an outer panel 11, which is usually press-molded from one steel sheet, and an inner panel 12, which consists of an assembly of a plurality of panels, at a peripheral edge of a door opening part 10. To the indoor side of a lower portion of the quarter portion, a wheelhouse inner panel 13 is joined.

The quarter lower trim 2, which is formed of a resin-molded product or the like, is locked by inserting a plurality of clips, not shown, which are protrudingly provided on the back surface side of a design surface, into holes in the vehicle body panel 1, and is configured so that in an edge part 2e along the door opening part 10, as shown in FIG. 3 or 4, an insertion piece 21 extending in a U-shape from the back surface side is fixed by being pinched, together with an opening flange 10a (11a, 12a), by an opening trim 3, the opening trim 3 being fitted in a state of being lapped on the indoor side of the opening flange 10a formed by joining an outer panel flange 11a and an inner flange 12a.

In the case in which the quarter lower trim 2 has a three-dimensional shape having a space 20, in which an air bag, a wiring for on-board equipment, and the like are accommodated, and the edge part 2e of the quarter lower trim 2 has a vertical wall surface 2d spreading in the direction separating from the opening flange 10a (the inner flange 12a) as shown in FIG. 3, a load F1 is applied to the vertical wall surface 2d by a passenger, the vertical wall surface 2d deflects and receives a force in the direction such that the insertion piece 21 comes off or is deflected.

To provide against such a load F1, a structure in which a projection part 21a is provided in a bent portion of the insertion piece 21 so as to abut against the vertical wall surface of the inner panel 12 as shown in FIG. 4 has been disclosed in Patent Document 1. Unfortunately, this structure cannot be adopted in the case in which the inner panel 12 has a flat shape having no vertical wall surface as indicated by symbol 12' in FIG. 4.

SUMMARY OF THE INVENTION

The present invention has been made in view of the actual situation of the prior art, and accordingly an object thereof is to provide a mounting structure for a vehicular interior member, which is simple in construction, and is capable of reliably fixing the edge part of an interior member to an opening flange.

To solve the above-described problem with the prior art, the present invention provides a mounting structure for a vehicular interior member, comprising:

an opening flange (10a) formed by joining an outer flange (11a) of an outdoor-side panel and an inner flange (12a) of an indoor-side panel to each other at the peripheral edge of a door opening;

an opening trim (3) fitted to the opening flange; and an interior member (2) which covers the vehicle indoor side of the indoor-side panel, in which an insertion piece (21) extending from the edge part back surface of the interior member, together with the opening flange, is pinched by the opening trim, characterized in that at the tip end of the insertion piece, a protrusion (22) capable of being locked to the edge end of the opening flange is formed, and by fitting the opening trim to the opening flange in the state in which the protrusion is locked, the edge part of the interior member is fixed to the opening flange.

In the structure in accordance with the present invention, according to the above-described configuration, even if a load (F1) in the direction such that the insertion piece is removed or bent is applied to the edge part of the insertion piece, by locking the protrusion of the insertion piece to the edge end of the opening flange, the removal of insertion piece and the deformation of interior member are restrained, and the interior member can be mounted stably. Moreover, this configuration can be adopted regardless of the shape of an inner panel, and also the construction is simple, so that the mounting structure of the present invention is also advantageous in terms of cost.

In the present invention, in the mode in which a joggle shaped part (12b) expanding to the vehicle indoor side is formed on the inner flange of the opening flange adjacent to the insertion piece, and the protrusion is locked to the edge end of the joggle shaped part, the locking allowance of protrusion can be assured sufficiently in the thickness direction of the flange, and the insertion piece is pinched by the expansion amount of the joggle shaped part, so that further reliable mounting can be performed.

In the present invention, in the mode in which the joggle shaped part expands to the inner flange via a gently inclined slant surface (12d), the opening trim is guided by the gently inclined slant surface when being fitted, so that a high assembling property is maintained advantageously while the above-described pinching force is ensured.

In the present invention, in the mode in which the edge end (12c) of the inner flange in the joggle shaped part (12b) is positioned on the base end side of the edge end of the outer flange, while the fitting depth of opening trim is positioned by the outer flange, the locking space of protrusion can be assured by utilizing the retreat amount of inner flange in the joggle shaped part, and the protrusion can assure a sufficient thickness. Therefore, the protrusion usually formed integrally with the resin-made interior member achieves a sufficient strength, so that breakage or the like at the assembly time can be prevented.

In the present invention, in the mode in which the thickness in the locking direction of the protrusion (22) is larger than the thickness of the insertion piece (21), the shearing strength of the protrusion is ensured, so that this mode is advantageous in preventing the interior member from coming off on account of the deformation or fracture of protrusion.

DESCRIPTION OF THE EMBODIMENTS OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

Since the basic configuration for carrying out the present invention is the same as that of the conventional example shown in FIGS. 1 to 4, the same symbols are applied to the same elements, and the explanation thereof is omitted. In the following, explanation is given focusing on points that are modified.

Figure 1:
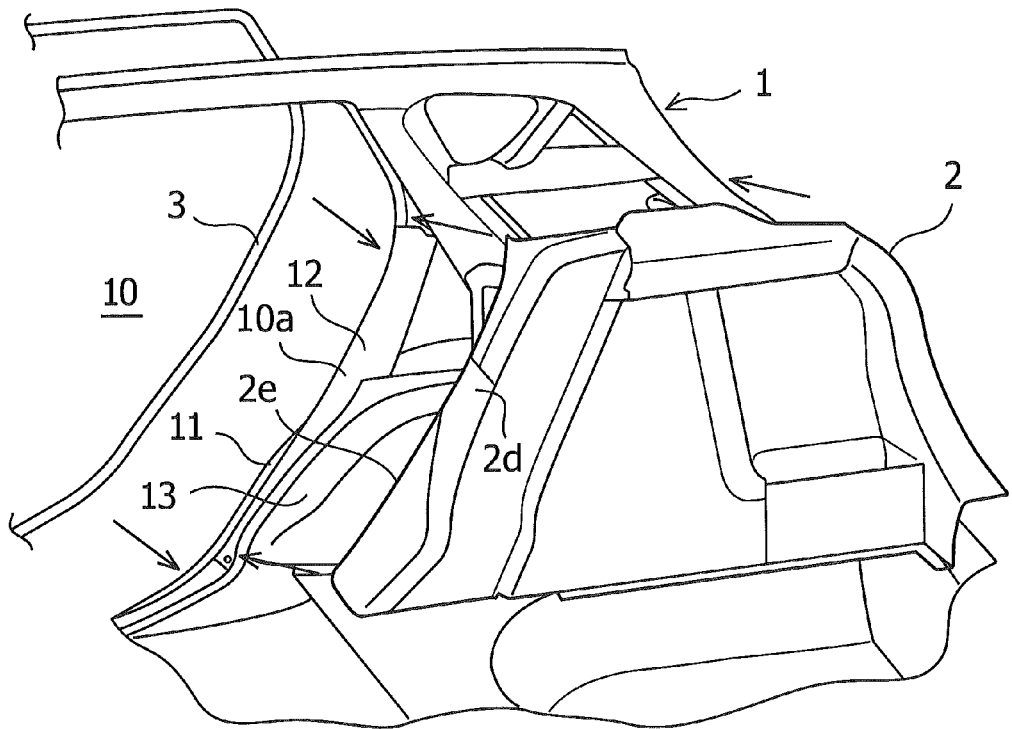
FIG. 1 is an exploded perspective view showing a state in which an interior member is mounted to a quarter portion.
Figure 2:
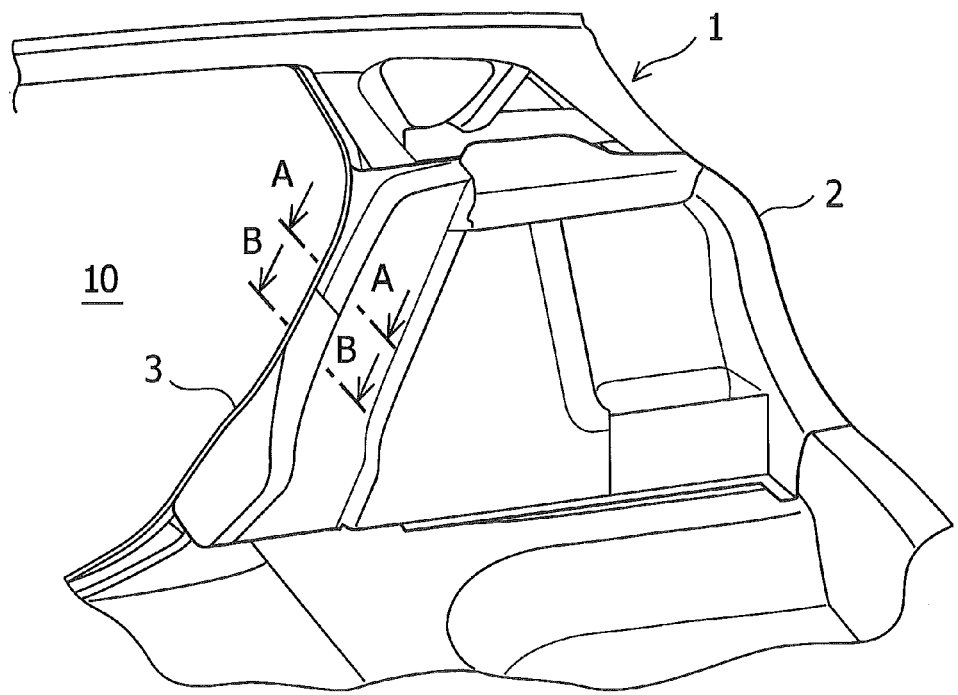
FIG. 2 is a perspective view showing a quarter portion to which an interior member is mounted.
Figure 3:
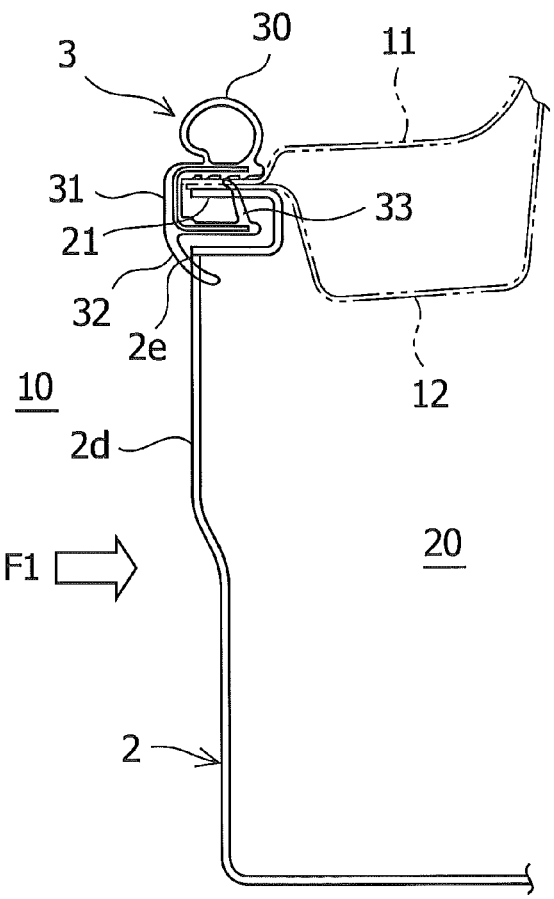
FIG. 3 is a sectional view taken along the line A-A of FIG. 2.
Figure 4:
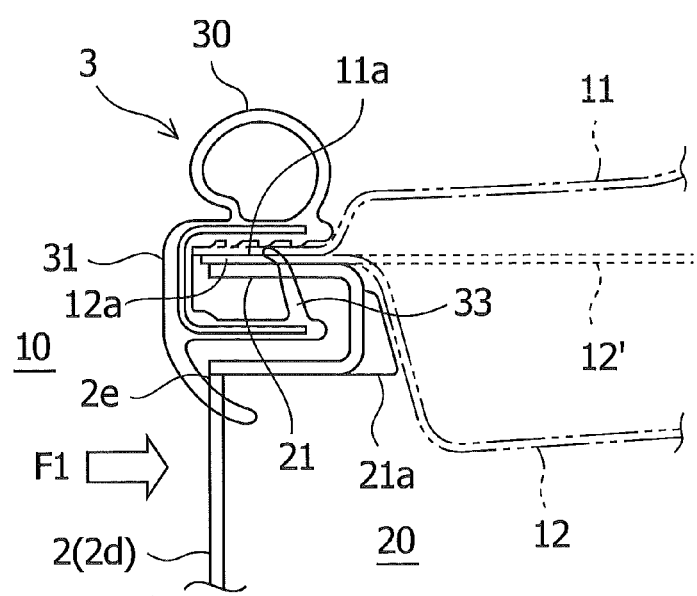
FIG. 4 is an enlarged sectional view taken along the line A-A of FIG. 2.
Figure 5:
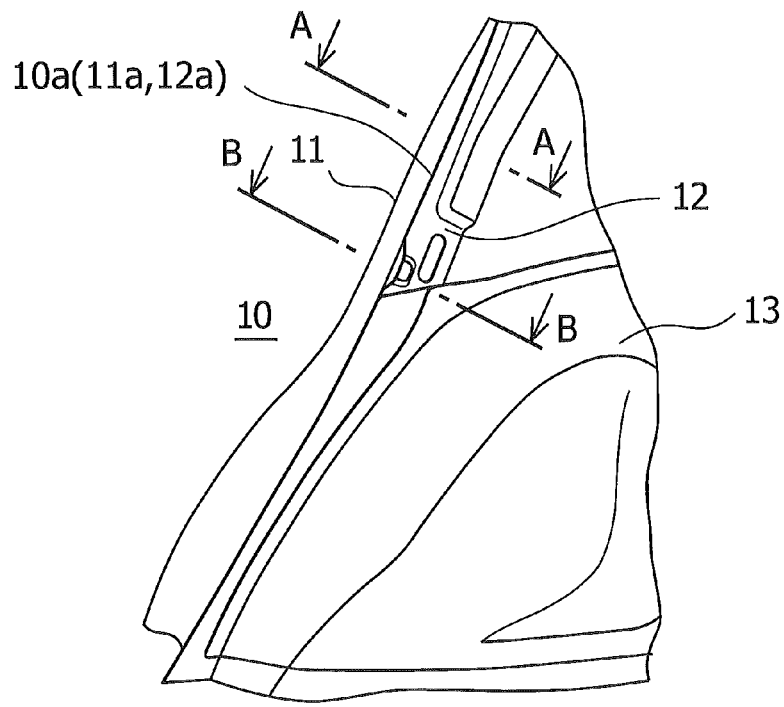
FIG. 5 is a perspective view showing a portion near the B-B section of FIG. 2 from which an interior member is removed.
Figure 6:
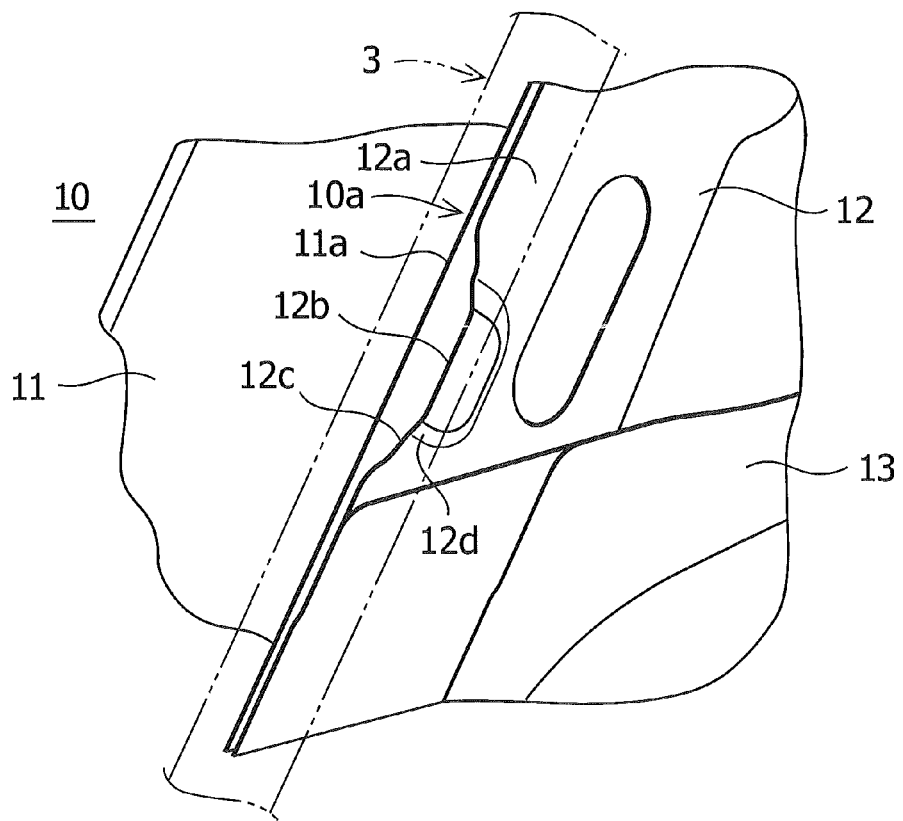
FIG. 6 is an enlarged view of a feature of FIG. 5 in accordance with an embodiment of the present invention.

FIGS. 5 to 8 show a mounting structure for an interior member in accordance with a basic embodiment of the present invention, and FIGS. 5 and 6 show a portion near the opening flange 10a to which the quarter lower trim 2, which is an interior member, is mounted. The A-A section indication and the B-B section indication in FIG. 5 agree with those in FIG. 2. As described before, in a portion near the A-A section, the vertical wall surface exists on the inner panel 12; on the other hand, in a portion near the B-B section, although the insertion piece 21 of the quarter lower trim 2 is set, the basic shape of the inner panel 12 is substantially flat. Therefore, a joggle shaped part 12b expanding to the vehicle indoor side is formed on the inner flange 12a forming the opening flange 10a of this portion.

Figure 7:
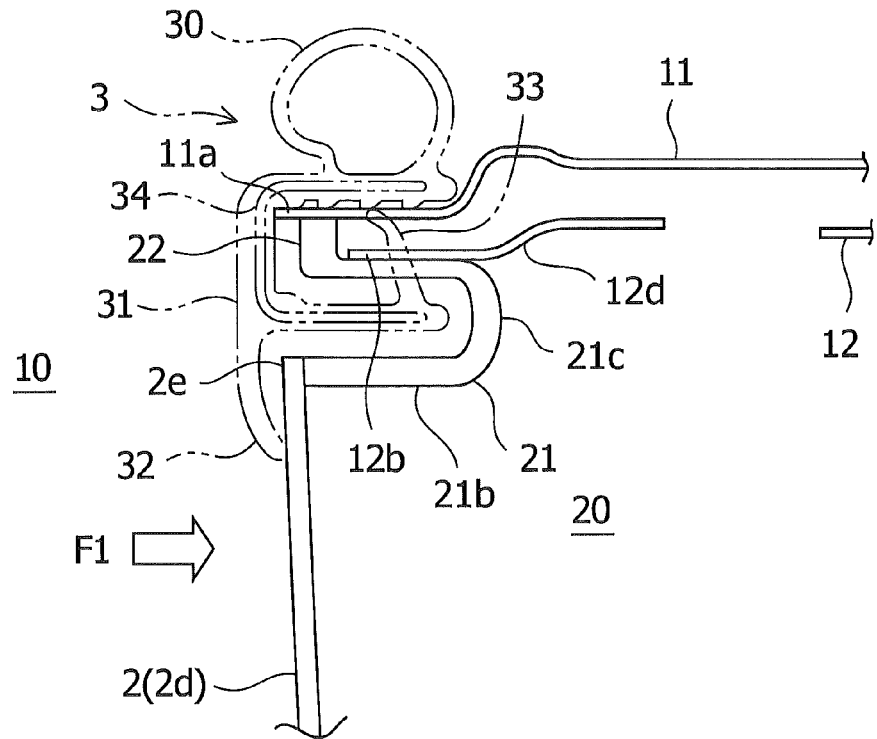
FIG. 7 is a sectional view taken along the line B-B of FIG. 5, showing a mounting structure for an interior member in accordance with an embodiment of the present invention.

As shown in FIGS. 6 and 7, the periphery of the joggle shaped part 12b excluding the edge end on the door opening 10 side is surrounded by a gently inclined slant surface 12d, and the joggle shaped part 12b expands with respect to the inner flange 12a via the gently inclined slant surface 12d. Also, an edge end 12c of the inner flange 12a in a portion in which the joggle shaped part 12b is formed is depressed to the base end side (the direction separating from the door opening 10) with respect to the basic shape line of the opening flange 10a; however, the outer flange 11a is maintained in a straight-line basic shape.

Figure 8:
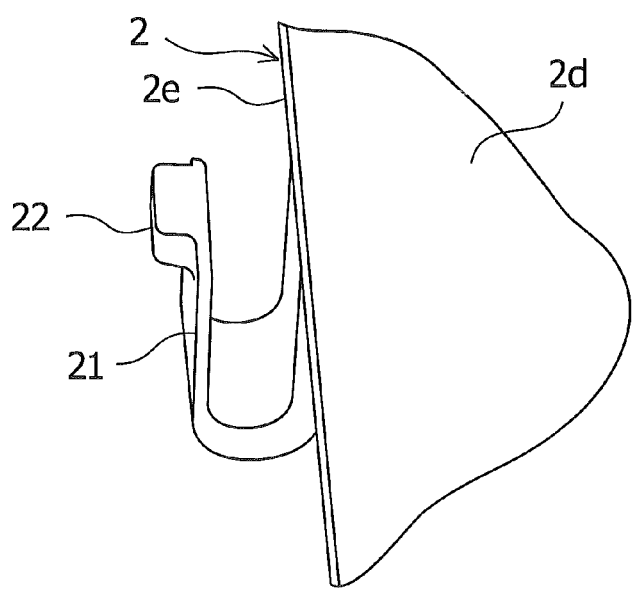
FIG. 8 is a perspective view of a feature showing an insertion piece of an interior member in accordance with an embodiment of the present invention.

On the other hand, as shown in FIGS. 7 and 8, the insertion piece 21 of the quarter lower trim 2 is formed into a U shape via a base part 21b extending to the back surface side of the edge part 2e of the quarter lower trim 2 and the bent part 21c, and at the tip end of the insertion piece 21 lapped on the joggle shaped part 12b of the inner flange 12a, a protrusion 22 capable of being locked to the edge end of the joggle shaped part 12b is formed integrally.

Since the protrusion 22 is protrudingly provided in the range of dimensional difference of the edge end 12c of the joggle shaped part 12b depressed with respect to the outer flange 11a, the basic shape line of the opening flange 10a is maintained by the outer flange 11a. Furthermore, since the protrusion 22 can be projected within the range of expansion height of the joggle shaped part 12b, locking to the edge end of the joggle shaped part 12b can be performed with a sufficient locking allowance.

As shown in FIG. 7, the edge part 2e of the quarter lower trim 2 provided with the above-described insertion piece 21 locks the protrusion 22 to the edge end of the joggle shaped part 12b. Also, by fitting the opening trim 3 in the state in which the insertion piece 21 is lapped on the top face of the joggle shaped part 12b, the edge part 2e of the quarter lower trim 2, together with the opening flange 10a (11a, 12b), is pinched by the opening trim 3, and is mounted to the opening flange 10a.

The opening trim 3 has a uniform cross-sectional shape in the lengthwise direction, and is extrusion-molded by using rubber or elastomer in the state in which a hollow weather strip 30 is extendingly provided on the outdoor side of a fitting part 31 having a U shape in cross section, an inner seal lip 32 is extendingly provided on the indoor side, a holding lip 33 is extendingly provided on the inside of the fitting part 31, and a metal-made core material 34 is inserted in the fitting part 31. In a state of being fitted to the opening flange 10a in the fitting part 31, the edge part 2e of the quarter lower trim 2 is covered with the inner seal lip 32.

In the above-described mounting state, even if a load F1 is applied to the vertical wall surface 2d of the quarter lower trim 2 by a passenger, since the protrusion 22 of the insertion piece 21 is locked to the edge end of the joggle shaped part 12b, the insertion piece 21 is prevented from coming off the opening trim 3. This coming-off preventive structure can be set regardless of the shape of the inner panel 12 because it is completed within the fitting part 31 of the opening trim 3. Since the edge part 2e of the quarter lower trim 2 is fixed to the end edge of the opening flange 10a (the inner flange 12a, the joggle shaped part 12b) by the insertion piece 21 and the protrusion 22, the rigidity of the vertical wall surface 2d of the quarter lower trim 2 is improved, fluttering is restrained, and a sense of security is given.

Figure 9:
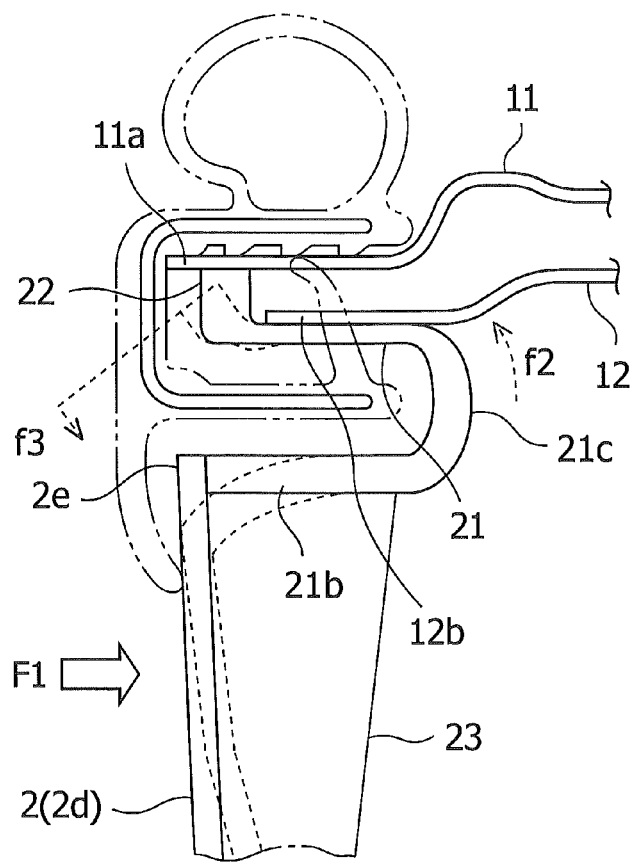
FIG. 9 is a sectional view taken along the line B-B of FIG. 5, showing a mounting structure for an interior member in accordance with another embodiment of the present invention.
Figure 10:
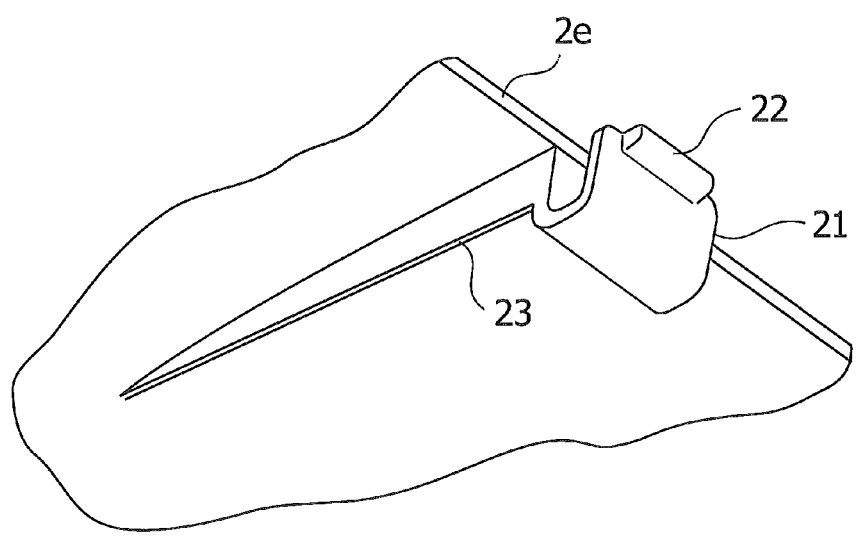
FIG. 10 is a perspective view of a feature, in which a portion near an insertion piece of an interior member in accordance with another embodiment of the present invention is viewed from the back surface side.

Furthermore, in another embodiment shown in FIGS. 9 and 10, a reinforcing rib 23 is extendingly provided ranging from the base part 21b of the insertion piece 21 to the back surface side of the vertical wall surface 2d of the quarter lower trim 2. By providing this reinforcing rib 23, not only is the surface rigidity of the vertical wall surface 2d improved, but also the rigidity of the insertion piece 21 is improved, and a deflection indicated somewhat exaggeratedly by broken lines in FIG. 9 is restrained. Accordingly, a bending stress f2 and a pulling-off force f3, which are created on the tip end side of the bent part 21c of the insertion piece 21, are restrained, so that the reinforcing rib 23 is also advantageous in improving the mounting rigidity of the edge part 2e of the quarter lower trim 2.

The above is a description of embodiments of the present invention. The present invention is not limited to the above-described embodiments, and various modifications and changes can be made based on the technical concept of the present invention.

For example, in the above-described embodiments, there has been shown the case in which the depressed edge part 12c is formed on the inner flange 12a of the opening flange 10a, and the joggle shaped part 12b is formed in the depressed region thereof. However, the joggle shaped part can be formed without providing the depressed region. In this case, the tip end of the insertion piece 21 projects from the basic line of the opening flange 10a by the thickness of the protrusion 22; however, since the opening trim 3 can be elastically deformed, some projection amount is covered by the elastic deformation. However, in order to exactly position the opening trim 3, it is advantageous that the joggle shaped part 12b be formed in the depressed region.

Also, the protrusion 22 of the insertion piece 21 can be locked directly to the edge end of the opening flange 10a without the formation of the joggle shaped part 12b. In this case as well, since the positioning problem as described above arises, it is advantageous that the depressed region be formed on the inner flange 12a and the outer flange 11a, and a thickness be ensured for the protrusion 22 of the insertion piece 21. The depressed region can also be provided on the inner flange 12a only. In this case, the locking allowance of the protrusion 22 can be ensured by the thickness of the inner panel 12 only. Therefore, in the case in which the joggle shaped part is not provided, it is preferable that the depressed region be provided on both of the inner and outer flanges Furthermore, in the above-described embodiments, explanation has been given of the case in which the mounting structure in accordance with the present invention is applied to the quarter lower trim 2 disposed at the rear of the rear door opening 10 of a four-door vehicle. However, the mounting structure in accordance with the present invention can be applied to the interior member adjacent to an door opening other than the above-described one, for example, a back door opening or a front door opening.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

That which is claimed:

1. A vehicular interior trim locking structure, comprising:
an opening flange formed by joining an outer flange of an outer panel and an inner flange of an inner panel to each other at the peripheral edge of a door opening;
an opening trim fitted to the opening flange; and
an interior trim which covers the inner panel the interior trim comprising an insertion piece extending from a back surface of the edge part of the interior trim so as to be pinched by the opening trim together with the opening flange,
wherein the insertion piece is provided with a protrusion at the tip end of the insertion piece so as to be locked to the edge of the opening flange, and whereby, the edge part of the interior trim is fixed to the opening flange by fitting the opening trim to the opening flange.

2. The vehicular interior trim locking structure according to claim 1, wherein a joggle shaped part expanding to the vehicle inside is formed on the inner flange of the opening flange adjacent to the insertion piece, and the protrusion is locked to the edge of the joggle shaped part.

3. The vehicular interior trim locking structure according to claim 2, wherein the joggle shaped part expands with respect to the inner flange via a gently inclined slant surface.

4. The vehicular interior locking structure according to claim 2, wherein the edge of the inner flange in the joggle shaped part is recessed with respect to the edge of the outer flange.

5. The vehicular interior trim locking structure according to claim 4, wherein the thickness in the locking direction of the protrusion is greater than the thickness of the insertion piece.

* * * * *

UNITED STATES PATENT AND TRADEMARK OFFICE
CERTIFICATE OF CORRECTION

| | | |
|---|---|---|
| PATENT NO. | : 8,985,663 B2 | Page 1 of 1 |
| APPLICATION NO. | : 13/974153 | |
| DATED | : March 24, 2015 | |
| INVENTOR(S) | : Yasuhara | |

It is certified that error appears in the above-identified patent and that said Letters Patent is hereby corrected as shown below:

In the Claims:
Column 6, Claim 4, Line 45:
    delete "interior locking structure"
        insert -- interior trim locking structure --

Signed and Sealed this
Twenty-ninth Day of December, 2015

Michelle K. Lee
*Director of the United States Patent and Trademark Office*